Patented Oct. 14, 1952

2,614,094

UNITED STATES PATENT OFFICE 2,614,094

PLASTICIZED VINYL RESIN COMPOSITIONS AND METHOD OF PREPARING THE SAME

George L. Wheelock, Akron, Ohio, assignor to The B. F. Goodrich Company, New York, N. Y., a corporation of New York No Drawing. Application November 14, 1946, Serial No. 709,774

6 Claims. (Cl. 260—45.5)

This invention relates to plasticized vinyl resin compositions and to methods of preparing the same. The invention more particularly relates to improved plasticizers for polyvinyl chloride, polyvinylidene chloride and of copolymers of vinyl or vinylidene chloride with each other or with such monomeric materials as methyl and ethyl acrylate, vinyl acetate, and other monomers containing a single olefinic double bond.

It is well known that vinyl resins may be plasticized or changed from the hard, horny and stiff state to a soft, plastic, workable condition by the addition at elevated temperatures of certain organic materials known as plasticizers.

However, the plasticizers heretofore used for this purpose are generally liquid oily materials such as organic esters, ethers and ketones and suffer from a number of disadvantages, among which are: their tendency to bleed out of the finished resin article and to be leeched out by contact with oils and solvents, and under other service conditions; enhancement of certain properties of the resin composition at the expense of other properties, for instance, electrical resistivity is reduced by the addition of certain plasticizers which are most efficient in increasing softness and workability; difficulty in incorporating such materials into the tough resinous material; the tendency of such oily materials to be decomposed or volatilized by conditions of extreme heat; the tendency of such oily plasticizing materials to migrate so as to destroy adhesive bonds and the fact that finished resin articles are not as hard as is often desired at ordinary temperatures if sufficient plasticizer is used to render the resin easily processable at elevated temperatures.

It is also known that polyvinyl chloride may be converted into a resilient, resistant rubber-like composition by blending it on a mixing mill with a synthetic rubber copolymer of butadiene-1,3 and acrylonitrile, this expedient having been disclosed in U. S. Patent 2,330,353 to Donald E. Henderson. Such a composition, however, is difficult to prepare since excessively high milling temperatures and careful control of other milling conditions are necessary to effect blending of the polyvinyl chloride and the synthetic rubber. Moreover, such a composition not containing added liquid plasticizers is not easily subjected to such processing operations as molding, calendering and extruding because of a lack of softness and a high degree of nerve. On the other hand, when such a blend of resin and synthetic rubber contains added liquid oily plasticizers it is subject to the same disadvantages as other vinyl resin compositions plasticized with such materials.

The principal object of this invention, accordingly, is to provide plasticized vinyl resin compositions, particularly polyvinyl chloride compositions, which are sufficiently soft and plastic to be processed easily even at temperatures lower than are ordinarily necessary and which at the same time are free from most of the disadvantages of polyvinyl chloride compositions plasticized with conventional liquid plasticizers.

I have discovered that this and other objects are attained and that polyvinyl chloride and other vinyl resins may be efficiently plasticized and softened by blending the hard, horny resin with a soft, low molecular weight copolymer of a butadiene-1,3 hydrocarbon and an acrylic nitrile of the formula:

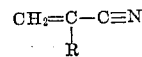

wherein R is selected from the class consisting of hydrogen, chlorine and alkyl radicals. Such copolymer plasticizers are quite different in properties from butadiene acrylonitrile synthetic rubbers, which are of high molecular weight and of an elastic rubbery nature, as will be more fully explained hereinbelow.

The soft low molecular weight copolymers of this class found to be particularly effective in the practice of this invention are the copolymers of butadiene-1,3 or isoprene with acrylonitrile, chloroacrylonitrile, methacrylonitrile and ethacrylonitrile. Especially good results are obtained when the plasticizing material is made by the copolymerization under conditions adapted to produce a soft low molecular weight polymer of from 50 to 80 parts by weight of butadiene-1,3 and 20 to 50 parts by weight of acrylonitrile although copolymers from as little as 30 parts butadiene-1,3 and as much as 70 parts acrylonitrile may also be used. The best results are obtained with soft low molecular weight copolymers made by polymerizing in aqueous emulsion substantially 2 parts by weight of butadiene-1,3 and 1 part by weight of acrylonitrile.

The synthetic resinous materials which have been found to be efficiently plasticized by the low molecular weight polymeric plasticizer of this invention are those polymers prepared from a monomeric material in which the predominant constituent is a chloroethylene containing from one to two chlorine atoms on one only of the carbon atoms. The resins of this class include polyvinyl chloride, polyvinylidene chloride, copolymers of vinyl chloride and vinylidene chloride with each other and copolymers of either one or both of these with lesser proportions of vinyl esters of carboxylic acids such as vinyl acetate, vinyl propionate, vinyl butyrate and the like; alkyl esters of acrylic and methacrylic acids such as methyl acrylate, ethyl acrylate, methyl methacrylate, methyl ethacrylate and the like; diethyl maleate, diethyl monochloromaleate, styrene, ethylene and other monomers containing a single olefinic double bond. The polymers found to be particularly effective are those polymers of a monomeric material in which the predominant constituent is vinyl chloride, for example, polyvinyl chloride itself and copolymers of vinyl chloride with lesser proportions of vinylidene chloride, vinyl acetate and methyl and ethyl acrylate.

As mentioned hereinabove, the copolymers employed as plasticizers in this invention (hereinafter sometimes called "polymeric plasticizers") are distinguished from butadiene acrylonitrile synthetic rubbers by their much higher degree of softness or plasticity and by their much lower molecular weight. More particularly, these polymeric plasticizers are characterized by possessing a Mooney viscosity (which is a measure of their softness and plasticity) below 35 as determined with a standard Mooney viscosimeter using a 1.500 inch rotor after 4 minutes at 212° F. In contrast, butadiene acrylonitrile synthetic rubbers possess a Mooney viscosity, as determined in the same way, of 50 or above.

The standard procedure for determining Mooney viscosity is set forth in Section D–1 of the booklet issued by the RFC, Office of Rubber Reserve, and entitled "Specifications for Government Rubbers (Effective January 1, 1946)." Briefly, the Mooney viscosity procedure consists in sheeting out the sample on a cool mill, according to a standard procedure, punching circular test pieces from a sample, punching holes in the test piece and mounting one test piece on the bottom of the rotor and one on the top of the rotor, and then enclosing the mounted test specimen in the Mooney die, which is maintained at 212° F. The rotor is started, and the dial readings recorded at five-second intervals for one minute before the specified time and one minute after the specified time. The viscosity is read from a plot of the above readings at exactly the specified time, which is usually the four-minute viscosity taken at 212° F. The Mooney viscosity is usually determined using a large rotor (1.500", plus or minus .001") for softer materials, and a small rotor (1.200" plus or minus .001") for the harder materials. The materials described herein are preferably tested using the large rotor, and the Mooney viscosity values so determined will be designated as "ML."

Molecular weight determinations by the cement viscosity method of Staudinger reveal that the copolymers of butadiene-1,3 and acrylonitrile, as usually produced by emulsion polymerization for use as solid oil-resistant synthetic rubbers, have molecular weights considerably above 100,000 usually in the neighborhood of 150,000 or 175,000 or more. Similar molecular weight determinations performed on the polymeric plasticizers of this invention indicate that they exhibit molecular weights lower than 85,000 and that the average molecular weight of the preferred plasticizing polymers is 65,000 or lower.

Visual inspection of the low molecular weight polymeric plasticizers of this invention reveals that they are nearly non-rubbery in nature in that they have little snap, tensile strength, rebound and other of the usual rubbery properties, and do not appreciably attain the physical properties of ordinary synthetic rubbers upon vulcanization in the usual manner. Polymeric plasticizers of this invention having a Mooney viscosity of 5 to 7 ML or less, are not true solids, but flow sufficiently to assume the shape of any container into which they are placed. When too soft to determine the Mooney viscosities, the polymeric plasticizers of this invention are very viscous liquids of a light yellow color.

The polymeric plasticizers of this invention may be produced by various polymerization methods, but are preferably produced by polymerization in aqueous emulsion of monomer mixtures of butadiene hydrocarbons with acrylic nitriles, under conditions adapted to produce a soft, low molecular weight copolymer. For example, the polymerization may be effected in aqueous emulsion in the presence of much larger amounts than are used in the production of synthetic rubber, of various sulfur compounds, called modifiers, well known to influence the plasticity of butadiene polymers prepared in their presence. Examples of such modifiers include the aliphatic mercaptans of 4 to 18 carbon atoms such as dodecyl mercaptan and in particular, since they are quite effective, the tertiary mercaptans, such as tertiary-dodecyl mercaptan and the like, the non-metallic xanthogenates such as diisopropyl xanthogen disulfide and the like, and other well-known modifying organic sulfur compounds such as B-(p-octylphenoxy) beta-mercapto diethyl ether, tetramethyl thiuram disulfide, piperidinium cyclopentamethylene dithiocarbamate, 4-phenyl thiazyl-2-disulfide and others. Another method of producing the low molecular weight polymeric plasticizers of this invention consists in terminating the polymerization in its very early stages long before it has gone to completion and afterwards removing the excess of monomeric material. For example, it has been found that copolymers produced by polymerization of a mixture of butadiene and acrylonitrile in aqueous emulsion in the presence of a normal quantity of modifier, are useful in this invention if the polymerization is terminated (by the addition of a suitable chemical polymerization inhibitor, such as hydroquinone) when about 30 to 75% or less of the monomers have been converted to the polymeric state. These two methods yield polymeric plasticizers equivalent in most respects but processes for the recovery of unreacted monomer from the synthetic latices are often difficult and uneconomical (since the polymerization equipment is not used to maximum capacity when operating at low conversion) and hence it is preferable to carry the polymerization to substantial completion in the presence of much larger than ordinary amounts of the polymerization modifier. The precise amount of modifier depends upon the activity of the particular compound used but in general varies from .8 to 5% by weight based on the weight of monomers polymerized. In any case, however, the softest or lowest molecular weight polymeric plasticizer utilizable in this invention has a minimum molecular weight of that of a butadiene acrylonitrile copolymer obtained by polymerizing a monomeric mixture of about 2 parts by weight of butadiene and 1 part by weight of acrylonitrile to substantially complete conversion at 30° C. in aqueous emulsion in the presence of 5% by weight on the monomeric mixture of t-dodecyl mercaptan.

In the practice of this invention the low molecular weight polymeric plasticizers described hereinabove may be mixed with the vinyl or vinylidene chloride resin in many ways. The soft, polymeric plasticizer may be admixed with the resin by dry-mixing methods on rubber mills, in internal mixers, and the like, or in solution in an organic solvent or as is preferred the resin in the form of a water dispersion such as a latex or aqueous slurry may be admixed with an aqueous emulsion or dispersion of the polymeric plasticizer and co-precipitation or co-coagulation of the blended emulsions or dispersions then effected by conventional methods as by addition of salts, acids, etc. The latter co-precipitation method has been found to produce smooth, plastic, very easily processable and generally higher quality blends of the resin and polymeric plasticizer, particularly when dispersions of the resin having a small particle size are used. For example, a latex of polyvinyl chloride may be prepared having an average particle size below 0.5 micron, say 0.2 micron in diameter, and used to produce exceptionally smooth, plastic and easily processed compositions by blending with a synthetic latex of a polymeric plasticizer having somewhat similar particle size distribution and then co-coagulating the blended latices. Such blended latices may also be used as such, as in the production of articles by coagulant dipping, or for coating purposes, and final articles of the plasticized resin composition produced directly.

The products obtained by practice of the invention in any of the above ways are far superior to vinyl and vinylidene chloride resins which are plasticized with conventional plasticizers and to mill mixed blends of such resins with butadiene acrylonitrile synthetic rubbers. They are softer, more plastic and more flexible and much easier subjected to processing operations such as molding and extruding than are the latter and they do not suffer from such defects as stiffening and cracking on exposure to high heat, oils, etc. as do the former. They also possess tensile strength, elongation, tear resistance and other mechanical poperties superior to compositions in which a conventional oily plasticizer is used, and although just as soft and easily processed at elevated temperatures are stronger, harder and more resistant at normal temperatures. Regardless of proportions of the resin and the polymeric plasticizer, they are clear and exhibit complete homogeneity since no opaqueness or whiteness appears when the compositions are bent in two directions at room temperature.

The invention will be described in greater detail with reference to certain specific examples demonstrating the use of soft low molecular weight butadiene acrylic nitrile copolymers as plasticizers for various polyvinyl resins.

EXAMPLE I

A blend of soft low molecular weight copolymer of butadiene-1,3 and acrylonitrile with polyvinyl chloride was made in the proportion of 50 parts of the copolymer to 50 parts of resin (dry solid base) by mixing latices of the two components, and then co-coagulating by adding the blended latices to a five percent aqueous salt brine solution which was acidified by the addition of sufficient sulphuric acid to a pH of 3.

The copolymer was prepared in the form of a latex by emulsion polymerization at 30° C. according to the following recipe:

| Material: | Parts by weight |
|---|---|
| Butadiene-1,3 | 66.7 |
| Acrylonitrile | 33.3 |
| Soap flakes (85% neutralized) | 5.0 |
| Diisopropyl xanthogen disulfide | 0.6 |
| Hydrogen peroxide (30% solution) | 0.3 |
| Sodium pyrophosphate, 1.57 parts | |
| Ferric sulfate, 0.28 do | 0.1 |
| Cobalt chloride, 0.0014 do | |
| Water | 250.0 |

The polymerization reaction was terminated when 71% of the monomeric material had been converted to the copolymer by the addition of sufficient hydroquinone in solution. The latex was found to be 26.7% in total solids content. A small portion of the latex was coagulated to produce a sample for the determination of the Mooney viscosity and the polymer was found to have a Mooney viscosity of 34 ML. The finished latex was stabilized by the addition of 2% of the polymer of heptylated diphenylamine age resistor added as an aqueous emulsion.

The resin latex used in the preparation of the blend was a latex of 49 to 50% total solid prepared by emulsion polymerization of vinyl chloride according to the following recipe:

| Material: | Parts by weight |
|---|---|
| Vinyl chloride | 100.00 |
| Potassium chloride | 0.25 |
| Sodium lauryl sulfate | 2.25 |
| Water | 94.50 |

After co-coagulation of the blended latices, the resulting slurry of crumbs was extracted with caustic to remove fatty acid formed from the soap by the acid coagulation. The crumbs of plasticizer-resin blend were then separated from the slurry serum and were wet-milled on a rubber-wash mill having corrugated rolls so as to form soft, coherent sheets, which were cut into convenient lengths and dried in a vacuum tray drier for eight to ten hours at 190° F. The dried plasticizer-resin blend was milled on a cold mill and was found to break down to a glass clear sheet with a few passes through the mill. The dried plasticizer-resin blend was sheeted out on a cool mill to 0.090" in thickness, and pressed in a mold for five minutes at 345° F. to form a test sheet which was 0.075" thick. The tensile strength of the test sheet was found to be 3200 lbs. per sq. in.; its elongation was found to be 345%; its modulus at 100% elongation was found to be 2,775 lbs. per sq. in., and its durometer hardness (C) was 93.

The compatibility of the pressed sheet of polymeric plasticized resin was evaluated by bending the pressed sheet in two directions at room temperature. Any incompatibility or incomplete solvation of the resin by the polymeric plasticizer would be immediately revealed by an opaqueness, "whiteness" or separation appearing in the zone of greatest flexure. The plasticizer-resin blend prepared in the above example was completely compatible for no whiteness appeared even after repeated bending.

EXAMPLE II

A polyvinyl chloride resin was plasticized by the addition of a low molecular weight polymeric plasticizer comprising a copolymer of butadiene-1,3 and acrylonitrile by blending a latex of the resin prepared as in Example I, with a latex of a butadiene-1,3 acrylonitrile copolymer and coagulating the blend.

The latex of the plasticizing copolymer was prepared by polymerizing the monomer mixtures to substantial completion in aqueous emulsion in the presence of 1.6% of diisopropyl xanthogen disulfide as a polymerization modifier according to the following recipe:

| Material: | Parts by weight |
|---|---|
| Butadiene-1,3 | 66.70 |
| Acrylonitrile | 33.30 |
| Distilled water | 190.00 |
| Soap flakes | 5.00 |
| Sulfuric acid (C. P.) | 0.13 |
| Hydrogen peroxide (30% solution) | 1.05 |
| Sodium salt of an alkaryl sulfonic acid | 2.80 |
| Sodium pyrophosphate | 0.0058 |
| Ferric sulfate | 0.0010 |
| Cobalt chloride | 0.00005 |
| Diisopropyl xanthogen disulfide | 1.60 |
| Sodium hydroxide | 0.133 |

The latex of the polymeric plasticizer was stabilized as in Example I, and was found to have a total solids content of 33.6%. The Mooney viscosity of the polymeric plasticizer was 6 ML.

The resin and polymeric plasticizer were blended in 70/30 proportion by weighing out 1.07 lbs. of the rubbery latex and 1.7 lbs. of the resin latex, and blending for five minutes with mild agitation. The blended latices were poured into a hot 1% calcium chloride solution (70 to 80° C.). The resulting slurry of crumbs was agitated for five minutes; the crumbs filtered, washed three times with soft water at 50° C. then dried for eight to ten hours at 190° F. The dried crumbs were sheeted out on a cold mill and test sheets prepared as before. The tensile strength of the composition was 2300 lbs. per sq. in.; the elongation was 290%; the modulus at 100% elongation was 2175 lbs. per sq. in., and the hardness (C durometer) was 93. The plasticizer and the resin were found to be completely compatible, and the plasticizing efficiency of the soft low molecular weight copolymer was exceedingly high. When the composition was extruded, calendered or otherwise processed, it was found that only moderate temperatures were necessary of the order of 200 to 275° F. The composition exhibited no "nerve" and therefore was especially adapted to extruding and calendering operations since it could be calendered cold or at temperatures of 300° F. or less with no noticeable deleterious effects. The all-around processing characteristics of the blend produced by the method of this example were far superior to those of blends made using the butadiene-1,3 acrylonitrile copolymer synthetic rubbers.

Further physical evaluation of the materials prepared in Examples I and II revealed that the materials were quite flexible at low temperatures; in fact, the low temperature properties were equal to or superior to the best ester-plasticized polyvinyl chloride composition. In addition, the tear resistance was superior to the best ester-plasticized polyvinyl chloride composition. Upon exposure to conditions of high heat, oils, acids and the like, the polymer-plasticized resin compositions of Examples I and II exhibited little tendency to stiffen and color up or otherwise deteriorate. These materials were also found to exhibit good dielectric strength indicating that they were especially useful for cable insulation. These materials were further found to exhibit exceptional resistance to flex-cracking, which is an especially valuable property in many applications. They were also highly resistant to ozone and ultra violet light, which makes them especially suitable for coating fabrics for use as auto upholstery and furniture coverings.

EXAMPLE III

The foregoing examples have been concerned with soft low molecular weight butadiene acrylonitrile copolymers prepared using a two to one monomer ratio. To illustrate the effect of varying the butadient acrylonitrile ratio, a number of latices were prepared having butadient acrylonitrile ratios of 95/5, 90/10, 80/20, 75/25, 70/30, 2/1, 63/37, 60/40 and 55/45. The various latices were prepared using the basic polymerization recipes below, but varying the amount of polymerization modifier as indicated in the table below. In all cases the modifier was tertiary dodecyl mercaptan.

| Material: | Parts by weight |
|---|---|
| Butadiene-1,3 (Variable) | Total 100.0 |
| Acrylonitrile (Variable) | |
| Water | 190.0 |
| Soap flakes | 5.0 |
| Sodium salt of an alkaryl sulfonic acid [1] | 2.8 |
| Potassium persulfate | 0.3 |
| Tertiary dodecyl mercaptan (Variable) | 0.80 to 1.75 |

[1] Added in as-supplied condition as a 36% aqueous solution, amount specified supplies 1 part dry weight basis of the active ingredient.

In the following table are listed the monomer ratios, modifier contents, Mooney viscosities, homogeneity and/or compatibility and processability evaluations of co-coagulated 70/30 polyvinyl chloride polymer blends, prepared using the polymers produced according to the above general recipe.

*Table*

| Ratio, Butadiene/ Acrylonitrile | Modifier, Parts by Weight | Mooney Viscosity | Processability | Compatibility |
|---|---|---|---|---|
| 95/5 | 1.0 | 30 ML | Very, very poor. | Broke on bending. |
| 90/10 | 0.8 | 31 ML | Do. | Do. |
| 80/20 | 0.8 | 20 ML | Fair. | Opaque on bending. |
| 75/25 | 0.85 | 19 ML | Good. | Fair. |
| 70/30 | 0.95 | 13 ML | Do. | Good. |
| 66.7/33.3 | 1.15 | 13 ML | Excellent. | Excellent. |
| 63/37 | 1.30 | 12 ML | Very good. | Very good. |
| 60/40 | 1.40 | 14 ML | Good. | Good. |
| 55/45 | 1.75 | 17 ML | Do. | Do. |

From the foregoing, it is seen that the optimum butadiene acrylonitrile monomer ratio for polymers used as low molecular weight polymeric plasticizers for polyvinyl chloride type resins fall in the range 66.7/33.3 to 55/45, although the polymers produced in the range of 80/20 to 55/45 were extremely useful as polymeric plasticizers for vinyl type resins. It was found that the preferred polymeric plasticizer was a polymer made by the polymerization of 2 parts butadiene-1,3 and 1 part of acrylonitrile and having a Mooney viscosity of 10 to 20 ML.

EXAMPLE IV

The polymeric plasticizer latex of Example II and the polyvinyl chloride latex of Example I were used to prepare a series of resin-copolymer blends, ranging from 95 parts of resin to 5 parts of polymeric plasticizer and also including the following resin plasticizer ratios: 90/10, 85/15, 70/30, 50/50, 30/70 and 10/90. The plasticizing copolymer and the resin were completely compatible in all the above blends, and in each case a plasticized composition which was softer, more flexible and more easily processable than a blend containing the same proportion of resin and a butadiene acrylonitrile synthetic rubber was obtained.

EXAMPLE V

It has been found that other acrylic nitriles such as methacrylonitrile, ethacrylonitrile, chloroacrylonitrile and the like may be substituted for acrylonitrile in the preparation of the low molecular weight polymeric plasticizers. For instance, methacrylonitrile was substituted for acrylonitrile in the polymerization recipe of Example II and 0.8 part of tertiary dodecyl mercaptan was substituted as the polymerization modifier for the diisopropyl xanthogen disulfide of Example II. The polymer produced had a Mooney viscosity of 7 ML. The resin latex used was the polyvinyl chloride latex of Example I. The resin and the low molecular weight polymeric plasticizer were blended in the proportions of 70 parts resin and 30 parts polymeric plasticizer. The resultant dried blend was found to be clear, soft, plastic, and easily processable and was possessed of exceptionally good heat stability.

It has also been found that low molecular weight polymeric plasticizers may be made by adding small proportions of other monomeric materials such as myrcene, methyl methacrylate, divinyl benzene, and the like as a third component to the mixture of butadiene-1,3 and acrylonitrile. All of these polymeric materials have high plasticizing efficiency and greatly improve the processability of vinyl and vinylidene chloride resins. When the Mooney viscosity of these polymeric plasticizing materials is 35 ML or below, exceptionally smooth, plastic and easily processable blends are produced.

In addition, other monomeric butadiene-1,3 hydrocarbons may be substituted for the butadiene-1,3 in the polymerization recipes of Examples I and II. For example, isoprene was substituted for all or part of the butadiene in admixture with acrylonitrile and/or the other monomeric materials mentioned above. In all cases the heat stability and processability of the resin were advantageously enhanced even when small amounts such as 10, 20 or 30 parts of the polymeric plasticizing materials were added to 100 parts of the resin.

Other vinyl resins of the class set forth hereinabove, such as polyvinylidene chloride, copolymers of vinyl chloride and vinylidene chloride, copolymers of vinyl chloride with a lesser amount of methyl acrylate etc. may be substituted for the polyvinyl chloride of the above examples with substantially equivalent results.

EXAMPLE VI

A blend of polyvinyl chloride with a polymeric plasticizer of this invention was made by slurrying a polyvinyl chloride powder having a particle size of from 0.5 to 3.0 microns in water, and blending the slurry with a latex of a butadiene acrylonitrile polymer similar to that prepared in Examples I and II, but having a Mooney viscosity of 27 ML. Co-precipitation of the resin and plasticizer was complete when the slurry-like latex blend was poured in hot calcium chloride solution. The plasticizer-resin blend became completely compatible with several passes on a warm mill (180° F.). The heat stability and processability of this blend were especially good, while its other properties were generally more desirable than those of an ester-plasticized polyvinyl chloride composition.

Still other methods may be utilized to accomplish the plasticization of the vinyl resin by the polymeric plasticizer of this invention. For instance, either the resin latex or the polymeric plasticizer latex may be produced by emulsion polymerization in the presence of cationic emulsification agents such as common soaps, and the other latex component produced by the emulsion polymerization in the presence of anionic emulsification agents such as laurylamine hydrochloride and co-precipitation of the two latices effected simply by mixing the two latices, with or without the addition of auxiliary coagulating agents such as bases or salts of the polyvalent metals such as calcium chloride.

It is possible to incorporate various compounding ingredients into the polymeric plasticizer resin blend either by adding these materials on a mill or in an internal mixer or by admixing a dispersion or emulsion of the ingredients with the blended polymer latex and resin latex before co-coagulation. For example, carbon black, calcium silicate, lead silicate and others, as well as liquid materials such as ester-type plasticizers, triethanolamine, tars and pitches may be incorporated in the polymeric plasticizer-resin blend by dispersing or emulsifying the compounding ingredient in water and adding the dispersion or emulsion to the blended latex. It is also possible to co-precipitate insoluble compounding ingredients with these polymeric plasticizer resin blends by associating the blended latices with aqueous solutions of soluble compounds chemically reactive one with the other to form the desired insoluble compounding ingredient.

While I have disclosed certain preferred manners of performing my invention, I do not thereby desire nor intend to limit myself solely thereto, for the precise proportions of the materials utilized may be varied and equivalent chemical materials may be employed if desired without departing from the spirit and scope of the invention as defined in the appended claims.

I claim:

1. A thermoplastic plasticized vinyl resin composition comprising from 10 to 95 parts by weight of a vinyl resin, said vinyl resin being a polymer of a monomeric material in which each monomer contains a single olefinic double bond and which is composed predominantly of vinyl chloride, and 5 to 90 parts by weight of a sole polymeric plasticizer therefor consisting of a polymeric product having a Mooney viscosity, as determined by means of the Mooney viscosimeter using the 1.5" rotor after 4 minutes at 212° F., below 35, and resulting from the polymerization of a monomeric mixture containing from 50 to 80% by weight of a butadiene-1,3 hydrocarbon and the remainder of a monomer selected from the class consisting of acrylonitrile, methacrylonitrile, ethacrylonitrile and chloroacrylonitrile, the minimum molecular weight of said polymeric product being that of a butadiene-1,3 acrylonitrile copolymer obtained by polymerizing to substantially complete conversion at 30° C. a polymerizable mixture of:

| Material: | Parts by weight |
|---|---|
| Butadiene-1,3 | 66.7 |
| Acrylonitrile | 33.3 |
| Water | 191.8 |
| Fatty acid soap flakes | 5.0 |
| Sodium salt of an alkaryl sulfonic acid | 1.0 |
| Potassium persulfate | 0.3 |
| Tertiary-dodecyl mercaptan | 5.0 |

2. A thermoplastic plasticized vinyl resin composition as defined in claim 1 in which the vinyl resin is polyvinyl chloride and the polymeric plasticizer is a copolymer of about 2 parts by weight of butadiene-1,3 and about 1 part by weight of acrylonitrile.

3. A thermoplastic plasticized vinyl resin composition comprising from 50 to 70 parts by weight of polyvinyl chloride and 30 to 50 parts by weight of a sole polymeric plasticizer therefor consisting of the polymeric product of the polymerization of a monomeric mixture consisting of from 55 to 66.7% by weight of butadiene-1,3 and the remainder acrylonitrile, said polymeric product having a Mooney viscosity, as determined by means of the Mooney viscosimeter using the 1.5" rotor after 4 minutes at 212° F., of about 5 to 20.

4. A thermoplastic plasticized vinyl resin composition comprising from 50 to 70 parts by weight of polyvinyl chloride and from 30 to 50 parts by weight of a sole polymeric plasticizer therefor consisting of the polymeric product of the polymerization of a monomeric mixture of about two parts by weight of butadiene-1,3 and one part by weight of acrylonitrile, said polymeric product having a Mooney viscosity, as determined by means of the Mooney viscosimeter using the 1.5" rotor after 4 minutes at 212° F., of about 5 to 20.

5. The method of making a thermoplastic plasticized vinyl resin composition which method comprises admixing an aqueous dispersion containing from 10 to 95 parts by weight of a vinyl resin, said vinyl resin being a polymer of a monomeric material in which each monomer present contains a single olefinic double bond and which is composed predominantly of vinyl chloride, with an aqueous dispersion containing from 5 to 90 parts by weight of a polymeric product resulting from the polymerization of a monomeric mixture containing from 50 to 80% by weight of a butadiene-1,3 hydrocarbon and the remainder of a monomer selected from the class consisting of acrylonitrile, methacrylonitrile, ethacrylonitrile and chloroacrylonitrile, and then co-coagulating the resulting mixed dispersion, said polymeric product having a Mooney viscosity, as determined by means of the Mooney viscosimeter using the 1.5" rotor after 4 minutes at 212° F., below 35, and a minimum molecular weight of that of a butadiene-1,3 acrylonitrile copolymer obtained by polymerizing to substantially complete conversion at 30° C. a polymerizable mixture of:

| Material: | Parts by weight |
|---|---|
| Butadiene-1,3 | 66.7 |
| Acrylonitrile | 33.3 |
| Water | 191.8 |
| Fatty acid soap flakes | 5.0 |
| Sodium salt of an alkaryl sulfonic acid | 1.0 |
| Potassium persulfate | 0.3 |
| Tertiary-dodecyl mercaptan | 5.0 |

6. The method of claim 5 wherein the vinyl resin is polyvinyl chloride, the polymeric product is one resulting from the polymerization of a monomeric mixture consisting of 55 to 66.7% by weight of butadiene-1,3 and the remainder acrylonitrile, said polymeric product having a Mooney viscosity, as determined by means of the Mooney viscosimeter using the 1.5" rotor after 4 minutes at 212° F., of about 5 to 20, and the mixed dispersion contains from 50 to 70 parts by weight of said polyvinyl chloride for each 30 to 50 parts by weight of said polymeric product.

GEORGE L. WHEELOCK.

REFERENCES CITED

The following references are of record in the file of this patent:

UNITED STATES PATENTS

| Number | Name | Date |
|---|---|---|
| 2,217,631 | Wolfe | Oct. 8, 1940 |
| 2,281,613 | Wollthan et al. | May 5, 1942 |
| 2,330,353 | Henderson | Sept. 28, 1943 |
| 2,373,347 | Schonefeld | Apr. 10, 1945 |
| 2,376,390 | Semon | May 22, 1945 |
| 2,430,562 | Fryling | Nov. 11, 1947 |
| 2,459,739 | Groten et al. | Jan. 18, 1949 |
| 2,460,038 | Serniuk | Jan. 25, 1949 |
| 2,469,132 | Schulze | May 3, 1949 |
| 2,490,713 | Schulze | Dec. 6, 1949 |
| 2,552,904 | Newberg et al. | May 15, 1951 |

OTHER REFERENCES

Bacon et al.: pages 525–529, Proceedings of the Rubber Tech. Conf. London, 1938.

Official Digest No. 262, November 1946, pages 615–622.